United States Patent Office 3,102,143
Patented Aug. 27, 1963

3,102,143
INSECTICIDAL COMPOSITIONS OF MATTER AND METHOD OF PREPARATION THEREFOR
John P. Luvisi, Park Ridge, Ill., assignor to Universal Oil Products Company, Des Plaines, Ill., a corporation of Delaware
No Drawing. Filed Dec. 27, 1960, Ser. No. 78,218
8 Claims. (Cl. 260—578)

This invention relates to novel compositions of matter which be employed as insecticides and to a method for the preparation thereof. More particularly the invention is concerned with a process for condensing halo substituted alkadienes or cycloalkadienes with alkyl aromatic compounds which contain at least one of the following substituents: amino, nitro, hydroxy or alkoxy, in the presence of a decomposing peroxide.

One object of this invention resides in a process for condensing halo substituted unsaturated compounds with alkyl aromatic compounds containing one of the aforementioned radicals in the presence of a decomposing peroxide to form novel compositions of matter which possess insecticidal properties.

A further object of this invention is found in a process for condensing chloro conjugated alkadienes or chloro conjugated cycloalkadienes with a substituted alkyl aromatic compound in the presence of a decomposing peroxide to form insecticidal compositions of matter.

One embodiment of this invention resides in a process which comprises condensing a halogenated compound selected from the group consisting of chloro subsitituted alkadienes and chloro substituted cycloalkadienes with a nuclearly substituted alkyl aromatic compound in which the nuclear substituents are selected from the group consisting of nitro, amino, alkoxy and hydroxy radicals, in the presence of a peroxy compound catalyst at condensation conditions, and recovering the resultant reaction product.

A further embodiment of the invention is found in a process which comprises condensing a chloro substituted conjugated cycloalkadiene in which at least one chlorine atom is attached to each of the doubly bonded carbon atoms with a nuclearly substituted alkyl aromatic compound in which the nuclear substituents are selected from the group consisting of nitro, amino, alkoxy and hydroxy radicals, in the presence of an organic peroxide catalyst at a temperature at least as high as the decomposition temperature of said organic peroxide catalyst, and recovering the resultant condensation product.

Yet another embodiment of the invention is found in a process which comprises condensing hexachlorocyclopentadiene with a nuclearly substituted alkyl aromatic compound in which the nuclear substituents are selected from the group consisting of nitro, amino, alkoxy and hydroxy radicals, in the presence of an organic peroxide catalyst at a temperature at least as high as the decomposition temperature of said organic peroxide catalyst, and recovering the resultant condensation product.

A specific embodiment of the invention is found in a process which comprises condensing hexachlorocyclopentadiene with p-nitrotoluene in the presence of di-t-butyl peroxide at a temperature in the range of from about 130° to about 150° C., and recovering the resultant pentachloro-(4-nitrobenzyl)-1,3-cyclopentadienes.

Other objects and embodiments referring to alternative chloro substituted conjugated alkadienes, chloro substituted conjugated cycloalkadienes, namely those in which at least one chlorine atom is attached to each of the doubly bonded carbon atoms, nuclearly substituted alkyl aromatic compounds and decomposing peroxides will be found in the following further detailed description of this invention.

It has now been found that chloro substituted alkadienes or chloro substituted cycloalkadienes in which at least one chlorine atom is attached to each of the doubly bonded carbon atoms may be condensed with a substituted alkyl aromatic compound in which the substituents are positioned on the nucleus of the aromatic ring, in the presence of a decomposing peroxide catalyst at a temperature at least as high as the decomposition temperature of the catalyst, to form compositions of matter which posses insecticidal properties. For example, hexachlorocyclopentadiene may be condensed with p-nitrotoluene to form 2,3,4,5,5-pentachloro-1-(4-nitrobenzyl)-1,3-cyclopentadiene, 1,2,3,4,5-pentachloro-5-(4-nitrobenzyl)-1,3-cyclopentadiene, and 1,3,4,5,5-pentachloro-2-(4-nitrobenzyl)-1,3-cyclopentadiene which will possess insecticidal activity, especially against houseflies. In addition to possessing insecticidal activity the compounds formed by the process of this invention will also find a wide variety of uses in the chemical field, particularly being used as intermediates in the preparation of resins, pharmaceuticals, plastics, etc.

Unsaturated chlorinated compounds containing only carbon, hydrogen and halogen atoms which may be reacted with the nuclearly substituted alkyl aromatic compound in the process of the present invention include straight chain halogenated conjugated alkadienes having the general formula

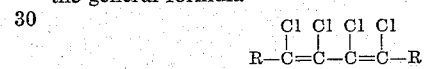

in which each of the R radicals is independently selected from the group consisting of hydrogen, alkyl, halo, and haloalkyl radicals containing from 1 to 6 carbon atoms, or polyhalocycloalkadienes containing only carbon, hydrogen and halogen atoms having the general formula:

in which X is independently selected from the group consisting of hydrogen, alkyl, halo, and haloalkyl radicals. Examples of these compounds includes haloalkadienes such as 1,2,3,4-tetrachloro-1,3-butadiene, hexachloro-1,3-butadiene, 1,2,3,4-tetrachloro-1,3-pentadiene, 1,2,3,4,5-pentachloro-1,3-pentadiene, 1,2,3,4-tetrachloro-1,3-hexadiene, 2,3,4,5-tetrachloro-2,4-hexadiene, etc.; and halocycloalkadienes, such as halogenated 1,3-cyclopentadienes which for purposes of this invention will be designated as halogenated cyclopentadienes including 1,2,3,4-tetrachlorocyclopentadiene, 1,2,3,4,5 - pentachlorocyclopentadiene, hexachlorocyclopentadiene, 1,2,3,4-tetrachloro-1,3-cyclohexadiene, 1,2,3,4,5-pentachloro-1,3-cyclohexadiene, 1,2,3,4,5,5-, 1,2,3,4,5,6- and 1,2,3,4,6,6-hexachloro-1,3-cyclohexadiene, octachloro - 1,3 - cyclohexadiene 1,2,4,5-tetrachloro-1,4-cyclohexadiene, 1,2,3,4,5-pentachloro-1,4-cyclohexadiene, 1,2,3,4,5,6- and 1,2,3,3,4,5-hexachloro-1,4-cyclohexadiene, heptachloro-1,4-cyclohexadiene, octachloro-1,4-cyclohexadiene, etc. In addition, it is also contemplated that polyhaloalkadienes and polyhalocycloalkadienes which are used in this process may contain more than one species of halo substituents, such as, for example, 1,4 - difluoro-1,2,3,4-tetrachloro-1,3-butadiene, 1,4-dibromo-1,2,3,4-tetrachloro-1,3-butadiene, 1,4-diiodo-1,2,3,4-tetrachloro-1,3-butadiene, 5,5-difluoro-5,5-dibromo and 5,5 - diiodo-1,2,3,4-tetrachloro-1,3-cyclopentadienes, etc., may also be used although not necessarily with equivalent results.

Nuclearly substituted aromatic hydrocarbons which may be utilized include nuclearly substituted alkyl benzenes as the preferred starting material, said alkyl benzenes having the generic formula

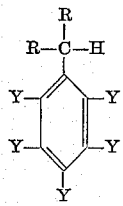

in which R is independently selected from the group consisting of hydrogen, alkyl, or cycloalkyl or both Rs together or part of a cycloalkyl ring and Y is selected from the group consisting of hydrogen, nitro, amino, hydroxy and alkoxy radicals, at least one Y being a radical other than hydrogen. Specific examples of these preferred nuclearly substituted alkyl benzenes include o-nitrotoluene, m-nitrotoluene, p-nitrotoluene, o-toluidine, m-toluidine, p-toluidine, o-methoxytoluene, m-methoxytoluene, p-methoxytoluene, o-methylphenol, m-methylphenol, p-methylphenol, o-nitroethylbenzene, m-nitroethylbenzene, p-nitroethylbenzene, o-aminoethylbenzene, m-aminoethylbenzene, p-aminoethylbenzene, o-ethylphenol, m-ethylphenol, p-ethylphenol, o-methoxyethylbenzene, m-methoxyethylbenzene, p-methoxyethylbenzene, o-nitropropylbenzene, m-nitropropylbenzene, p-nitropropylbenzene, o-aminopropylbenzene, m-aminopropylbenzene, p-aminopropylbenzene, o-propylphenol, m-propylphenol, p-propylphenol, o-methoxypropylbenzene, m-methoxypropylbenzene, p-methoxypropylbenzene, o-ethoxytoluene, methoxytoluene, p-ethoxytoluene, o-ethoxyethylbenzene, m-ethoxyethylbenzene, o-propoxyethylbenzene, m-propoxyethylbenzene, p-propoxyethylbenzene, etc. It is also contemplated within the scope of this invention that alkyl aromatic compounds containing more than one aromatic ring may also be utilized although not necessarily with equivalent results, examples of said compounds including 4-nitro-1-methylnaphthalene, 4-amino-1-methylnaphthalene, 4-hydroxy - 1 - methylnaphthalene, 4-methoxy-1-methylnaphthalene, 2-nitro-1-methylnaphthalene, 2-amino-1-methylnaphthalene, 2-hydroxymethylnaphthalene, 2-methoxy-1-methylnaphthalene, 3-nitro-1-methylnaphthalene, 3-amino-1-methylnaphthalene, 3-hydroxy - 1 - methylnaphthalene, 3-methoxy-1-methylnaphthalene, 4-nitro - 1 - anthracene, 4-amino-1-methylanthracene, 4 - hydroxy-1-methylanthracene, 4-methoxy-1-methylanthracene, 2-nitro-1-anthracene, 2-amino-1-methylanthracene, 2-hydroxy-1-methylanthracene, 2-methoxy-1-methylanthracene, 3-nitro-1-anthracene, 3-amino-1-methylanthracene, 3-hydroxy-1-methylanthracene, 3-methoxy - 1 - methylanthracene, 4-nitro-1-phenanthrene, 4-amino-1-methylphenanthrene, 4-hydroxy-1-methylphenanthrene, 4-methoxy-1-methylphenanthrene, 2 - nitro-1-phenanthrene, 2-amino-1-methylphenanthrene, 2-hydroxy-1-methylphenanthrene, 2-methoxy - 1 - methylphenanthrene, 3-nitro-1-phenanthrene, 2-amino-1-methyl phenanthrene, 3-hydroxy - 1 - methylphenanthrene, 3-methoxy-1-methylphenanthrene, 4-nitro-1-chrysene, 4-amino-1-methylchrysene, 4-hydroxy - 1 - methylchrysene, 4-methoxy - 1 - methylchrysene, 2-nitro-1-chrysene, 2-amino-1-methylchrysene, 2-hydroxy-1-methylchrysene, 2-methoxy-1-methylchrysene, 3-nitro-1-chrysene, 3-amino-1-methylchrysene, 3-hydroxy-1-methylchrysene, 3-methoxy-1-methylchrysene, etc.

The catalyst which may be used in the present process are those which are capable of forming free radicals under the reaction conditions. These include peroxy compounds, containing the bivalent radical —O—O— which decomposes to form free radicals which initiate the general reaction of the present invention and which are capable of inducing the condensation of the chloro substituted alkadiene or cycloalkadiene with the nuclearly substituted alkyl aromatic compound. Examples of these catalysts include the persulfates, perborates, percarbonates of ammonium and of the alkali metals, organic peroxy compounds, etc. The organic peroxy compounds constitute a preferred class of catalyst for use in this invention and include peracetic acid, persuccinic acid, dimethyl peroxide, diethyl peroxide, dipropyl peroxide, di-t-butyl peroxide, butyryl peroxide, lauroyl peroxide, benzoyl peroxide, tetralin peroxide, urea peroxide, t-butyl perbenzoate, t-butyl hydroperoxide, methylcyclohexyl hydroperoxide, cumene hydroperoxide, diisopropylbenzyl hydroperoxide, etc. Mixtures of peroxy compound catalysts may be employed or the peroxy compound catalysts may be utilized in admixture with various diluents. Thus, organic peroxy compounds which compounded commercially with various diluents which may be used include benzoyl peroxide compounded with calcium sulfate, benzoyl peroxide compounded with camphor, etc. Only catalytic amounts (less than stoichiometric amounts) need be used in this process.

The reaction which occurs may be indicated as follows:

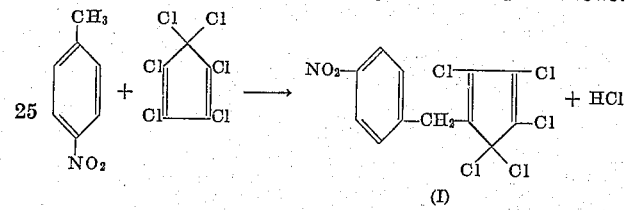

The reaction product may contain not only 1-(4-nitrobenzyl)-2,3,4,5,5-pentachloro-1,3-cyclopentadiene (I) but also some of the isomeric products such as 5-(4-nitrobenzyl)-1,2,3,4,5-pentachloro-1,3-cyclopentadiene (II) and 2 - (4 - nitrobenzyl) - 1,3,4,5,5 - pentachloro - 1,3 - cyclopentadiene (III).

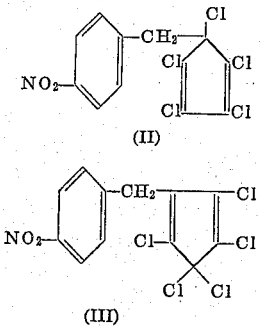

The reaction of the present process involving the aforementioned starting materials is effected at elevated reaction temperatures which should be at least as high as the initial decomposition temperature of the free radical generating catalyst, such as the peroxide compound, in order to liberate and form free radicals which promote the reaction. In selecting the particular reaction temperature for use in the process of the present invention, two considerations must be taken into account. First, sufficient energy by means of heat must be supplied to the reaction system so that the reactants, namely the chloro substituted alkadiene or chloro substituted cycloalkadiene and the substituted alkyl aromatic compound, will be activated sufficiently for consideration to take place when free radicals are generated by the catalyst. Second, free radical generating catalysts such as peroxy compounds, particularly organic peroxides, decompose at a measurable rate with time in a logarithmic function dependent upon temperature. This rate of decomposition can be and ordinarily is expressed as the half life of a peroxide at a particular temperature. For example, the half life in hours for di-t-butyl peroxide is 17.5 hours at 125° C., 5.3 hours at 135° C. and 1.7 hours at 145° C. (calculated from data for the first 33% decomposition). A reaction system temperature must then be selected so that the free radical generating catalyst decomposes smoothly with the generation of free radicals at a half life which is not too long. In other words, sufficient free radicals must be present to induce the present chain reaction to take place, and these radicals must be formed at a temperature at which the reactants are in a suitably activated state for condensation. When the half life of the free radical generating catalyst is greater than 10 hours, radicals are not generated at a sufficient rate to cause the reaction of the process of this invention to go forward at a detectable rate. Thus, the reaction temperature may be within the range of from about 50° to about 300° C. and at least as high as the decomposition temperature of the catalyst, by which is meant a temperature such that the half life of the free radical generating catalyst is not greater than 10 hours. Since the half life for each free radical generating catalyst is different at different temperatures, the exact temperature to be utilized in a particular reaction will vary. However, persons skilled in the art are well acquainted with the half life vs. temperature data for different free radical generating catalysts and thus it is within the skill of one familiar with the art to select the particular temperature needed for any particular catalyst. However, the operating temperatures generally do not exceed the temperature at which the half life of the catalyst is not more than 10 hours or more by more than about 150° C. since free radical generating catalysts decompose rapidly under such conditions. For example, when a free radical generating catalyst such as t-butyl perbenzoate is used, having a decomposition temperature of approximately 115° C., the operating temperature of the process if from about 115° to about 265° C. When di-t-butyl peroxide having a decomposition temperature of about 130° C. is used, the process is run at a temperature ranging from about 130° to about 280° C. Higher reaction temperatures may be employed, but little advantage is gained if the temperature is more than the hereinbefore mentioned 150° C. higher than the decomposition temperature of the catalyst. In addition to the elevated temperatures which are utilized the reaction may also be effected at elevated pressures ranging from about 1 to about 100 atmospheres or more, the preferred operating pressure of the process being that which is required to maintain a substantial portion of the reactants in liquid phase. Pressure is not an important variable in the process of this invention. However, because of the relatively low boiling point of some of the reactants it is necessary to utilize pressure withstanding equipment to insure liquid phase conditions. In batch type operations it is often desirable to charge the reactants and catalyst to a vessel, and to pressure the vessel with 10, or 30 or 50 or more atmospheres with an inert gas such as nitrogen, said pressure helping to insure the presence of liquid phase conditions. However, when the mole quantity of reactants is sufficient, the pressure which they themselves generate at the temperature utilized is sufficient to maintain the desired phase conditions. Furthermore, the concentration of the catalyst employed in this process may vary over a rather wide range but it is desirable to utilize low concentrations of catalysts such as from about 0.1% to about 10% of the total weight of the combined starting materials charged to the process. The reaction time may be within the range of from less than one minute to several hours depending upon the temperature and half life of the free radical generating catalyst. Generally speaking, contact times of at least 10 minutes are preferred.

It is also contemplated within the scope of this invention that the products obtained by condensing the chloro substituted conjugated alkadiene or chloro substituted conjugated cycloalkadiene with the nuclearly substituted alkyl aromatic compound may be further reacted with other dienophiles such as maleic anhydride, ethylene, bicycloheptene, bicycloheptadiene, etc., to yield other compositions of matter which are novel in structure and which will also possess insecticidal activity. For example the compound 2,3,4,5,5-pentachloro-1-(4-nitrobenzyl)-1,3-cyclopentadiene which is prepared by condensing hexachlorocyclopentadiene with p-nitrotoluene may be further condensed with bicycloheptadiene at an elevated temperature of from about 50° to about 250° C. or more and at a pressure ranging from about 1 to about 100 atmospheres or more in a Diels-Alder manner to yield 2,3,4,10,10-pentachloro-1-(4-nitrobenzyl)-1,4,4a,5,8,8a-hexahydro-1,4,5,8-dimethanonaphthalene.

The physical properties of the present chloroalkenic or chlorocycloalkenic derivatives of a substituted alkyl aromatic compound, and the effects they have on entomological forms of life make them particularly desirable as insecticides and insect repellents, the compounds having many of the features desired for materials of this purpose. They are, for example, toxic to insects which are destructive of plant life and materials normally subject to insect infestation, their toxic effects being manifested by contact of the poison with the insect. The insecticides comprising the compounds of the present invention are thus effective against chewing as well as sucking types of insects. In addition, the compounds are sufficiently volatile so that when applied to plant life intended for subsequent human consumption, the plants when harvested and after allowing a reasonable time for evaporation of the applied insecticides therefrom retain none of the toxicant to prevent use of the plant and consumption as food. On the other hand, the compounds are of sufficient limited volatility to be retained on the insect for the time required to accomplish the toxic effects of the compounds.

If so desired, the insecticides of the present invention may be combined with a diluent, said diluent being employed for the specific purpose of reducing the concentration of insecticides to the desired level in specific insecticide formulation. The particular formulation of active components in combination with the solvent or dispersant will depend upon its application. Compositions containing as high as 20% of active component may be preferred in some instances to allow deep penetration of the insecticides if so desired, as in the treatment of fibrous material, such as wood, for extinction of particular infestation, for example wood termites. For other purposes, the required concentration of active components in the formulation may be as low as 0.1% as, for example, in the treatment of fabrics for destroying moth larvae. In utilizing the present insecticidal compounds against most insects, a composition containing from about 0.1% to about 5% by weight of the active component is highly effective. The choice of the most desirable concentration depends upon the method utilized to apply the insecticidal composition to the infested article. In addition to the use of normal solvents, the insecticides may be dissolved in a suitable high boiling solvent or may be dispersed in a low molecular weight normally gaseous carrying agent such as propane, butane, the Freons, etc. The latter may be compressed and liquefied into a small bomb containing the insecticide which, upon release of pressure therefrom, vaporizes the liquid and suspends a quantity of the active component therein, thus providing a convenient spraying method of applying the insecticide.

The process of the present invention may be effected in any suitable manner and may comprise either a batch or a continuous type operation. For example, when a batch type operation is used, a quantity of the starting materials comprising a chloro substituted conjugated alkadiene or chloro substituted conjugated cycloalkadiene along with the nuclearly substituted alkyl aromatic compound in which the substituents are of the type hereinbefore set forth are placed in an appropriate apparatus provided with heating and mixing means along with a catalytic amount of the organic peroxy compound. If the reaction is to be effected at atmospheric temperatures a condensation flask is sufficient. However, in the event that temperatures higher than those normally used are to be employed along with a correspondingly higher pressure the aforesaid feed stocks may be condensed by being placed in the glass liner of a rotating autoclave along with the catalyst and thereafter sealing said liner into said rotating autoclave. The desired pressure is effected by the introduction of an inert gas such as nitrogen and the apparatus is thereafter heated to the desired operating temperature. Upon completion of the desired residence time the flask or autoclave along with the contents thereof are cooled to room temperature. Any excess pressure is vented and the reaction product is separated from any remaining catalyst and/or side reaction products and recovered by conventional means such as fractional distillation, crystallization, etc.

Another method of effecting the condensation reaction of the present type is by a continuous type operation. In this type of operation the starting materials comprising the chloro substituted alkadiene or chloro substituted cycloalkadiene and the nuclearly substituted alkyl aromatic compound are continuously charged to a reaction zone which is maintained at the proper operating conditions of temperature and pressure. These starting materials may be charged to the reaction zone through separate lines, or if so desired, may be combined before entry into said reactor and charged thereto in a single line. The reaction zone may comprise an unpacked vessel or coil or may be lined with an adsorbent packing material such as fire brick, alumina, dehydrated bauxite and the like. The peroxy compound which acts as a catalyst may also be continuously charged to the reaction zone through separate lines in a catalytic amount per amount of starting material. After a desired residence time has elapsed the reaction product is continuously withdrawn, separated from the reactor effluent and purified by conventional means hereinbefore set forth.

If it is desired that the reaction products thus obtained are to be utilized as intermediates in the preparation of other insecticidal compositions of matter by condensing these products with other dienophiles the reaction may be effected, either in a batch type operation or in a continuous type operation, in a manner similar to that hereinbefore set forth, the only difference being that the latter reaction will proceed in a Diels-Alder manner in the absence of any catalytic matter.

Examples of reaction products which may be obtained by the condensation process of the present invention include 1-(4-nitrobenzyl)-1,2,3,4,4-pentachloro-1,3-butadiene,
1-(4-aminobenzyl)-1,2,3,4,4-pentachloro-1,3-butadiene,
1-(4-methoxybenzyl)-1,2,3,4,4-pentachloro-1,3-butadiene,
1-(4-hydroxybenzyl)-1,2,3,4,4-pentachloro-1,3-butadiene,
1-(2-nitrobenzyl)-1,2,3,4,4-pentachloro-1,3-butadiene,
1-(2-aminobenzyl)-1,2,3,4,4-pentachloro-1,3-butadiene,
1-(2-methoxybenzyl)-1,2,3,4,4-pentachloro-1,3-butadiene,
1-(2-hydroxybenzyl)-1,2,3,4,4-pentachloro-1,3-butadiene,
1-(3-nitrobenzyl)-1,2,3,4,4-pentachloro-1,3-butadiene,
1-(3-aminobenzyl)-1,2,3,4,4-pentachloro-1,3-butadiene,
1-(3-methoxybenzyl)-1,2,3,4,4-pentachloro-1,3-butadiene,
1-(3-hydroxybenzyl)-1,2,3,4,4-pentachloro-1,3-butadiene,
2,3,4,5,5-pentachloro-1-(4-nitrobenzyl)-1,3-cyclopentadiene,
2,3,4,5,5-pentachloro-1-(3-nitrobenzyl)-1,3-cyclopentadiene,
2,3,4,5,5-pentachloro-1-(2-nitrobenzyl)-1,3-cyclopentadiene,
2,3,4,5,5-pentachloro-1-(4-aminobenzyl)-1,3-cyclopentadiene,
2,3,4,5,5-pentachloro-1-(3-aminobenzyl)-1,3-cyclopentadiene,
2,3,4,5,5-pentachloro-1-(2-aminobenzyl)-1,3-cyclopentadiene,
2,3,4,5,5-pentachloro-1-(4-hydroxybenzyl)-1,3-cyclopentadiene,
2,3,4,5,5-pentachloro-1-(3-hydroxybenzyl)-2,3-cyclopentadiene,
2,3,4,5,5-pentachloro-1-(2-hydroxybenzyl)-1,3-cyclopentadiene,
2,3,4,5,5-pentachloro-1-(4-methoxybenzyl)1,3-cyclopentadiene,
2,3,4,5,5-pentachloro-1-(3-methoxybenzyl)1,3-cyclopentadiene,
2,3,4,5,5-pentachloro-1-(2-methoxybenzyl)1,3-cyclopentadiene,
1,3,4,5,5-pentachloro-2-(4-nitrobenzyl)-1,3-cyclopentadiene,
1,3,4,5,5-pentachloro-2-(3-nitrobenzyl)-1,3-cyclopentadiene,
1,3,4,5,5-pentachloro-2-(2-nitrobenzyl)-1,3-cyclopentadiene,
1,3,4,5,5-pentachloro-2-(4-hydroxybenzyl)-1,3-cyclopentadiene,
1,3,4,5,5-pentachloro-2-(3-hydroxybenzyl)-1,3-cyclopentadiene,
1,3,4,5,5-pentachloro-2-(2-hydroxybenzyl)-1,3-cyclopentadiene,
1,3,4,5,5-pentachloro-2-(4-methoxybenzyl)-1,3-cyclopentadiene,
1,3,4,5,5-pentachloro-2-(3-methoxybenzyl)-1,3-cyclopentadiene,
1,3,4,5,5-pentachloro-2-(2-methoxybenzyl)-1,3-cyclopentadiene.

It is to be understood that the aforementioned compounds are only representative of the type of reaction products which are obtained from the aforementioned condensation process, and that the present invention is not necessarily limited thereto.

The following examples are given to illustrate the process of the present invention which, however, are not intended to limit the generally broad scope of the present invention in strict accordance therewith.

*Example I*

In this example 41 g. (0.3 mole) of p-nitrotoluene and 164 g. (0.6 mole) of hexachlorocyclopentadiene along with 8 g. of di-t-butyl peroxide were heated in a condensation flask provided with heating and stirring means at a temperature in the range of from about 130° C. to about 140° C. for a period of about 4.5 hours. The reaction product which was recovered comprised a mixture of 2,3,4,5,5-pentachloro-1-(4-nitrobenzyl)1,3-cyclopentadiene mixed with 1,3,4,5,5-pentachloro-2-(4-nitrobenzyl) - 1,3 - cyclopentadiene and 1,2,3,4,5-pentachloro-5-(4-nitrobenzyl)1,3-cyclopentadiene, the mixture having a boiling point of 330° C.

*Example II*

In this example a mixture of 41 g. (0.3 mole) of p-nitrotoluene and 156 g. (0.6 mole) of hexacholoro-1,3-butadiene along with 8 g. of di-t-butylperoxide are heated at a temperature in the range of from about 130° to about 140° C. for a period of about 5 hours. At the end of this time the reaction product comprising 1-(4-nitrobenzyl)-1,2,3,4,4-pentachloro-1,3-butadiene or as it may also be called 5-(4-nitrobenzyl)-1,1,2,3,4-pentachloro-1,3-pentadiene is separated and recovered.

*Example III*

In this example a mixture of 32 g. (0.3 mole) of p-toluidine and 164 g. (0.6 mole) of hexachlorocyclopentadiene is heated in the presence of 8 g. of di-t-butyl peroxide at a temperature in the range of from about 130° to about 140° C. for a period of about 5 hours. At the end of this time the condensation flask and contents thereof are cooled to room temperature and the reaction product comprising a mixture of 2,3,4,5,5-pentachloro-1-(4 - aminobenzyl) - 1,3 - cyclopentadiene, 1,3,4,5,5-pentachloro-2-(4-aminobenzyl)-1,3-cyclopentadiene and 1,2,3, 4,5-pentachloro-5-(4-aminobenzyl)-1,3-cyclopentadiene is separated and recovered.

Example IV

A mixture of 32 g. (0.3 mole) of p-toluidine and 156 g. (0.6 mole) of hexachlorobutadiene-1,3 along with 8 g. of di-t-butyl peroxide is treated in a manner similar to that set forth in the above examples. At the end of the desired reaction period, the flask and contents thereof are cooled to room temperature and the desired reaction product comprising 1-(4-aminobenzyl)-1,2,3,4,4-pentachloro-1,3-butadiene is recovered.

Example V

A mixture of 32 g. (0.3 mole) of m-methylphenol along with 164 g. (0.6 mole) of hexachlorocyclopentadiene are 8 g. of dimethylperoxide is treated in a manner similar to that set forth in the above examples. At the end of the desired residence time the reaction product comprising a mixture of 2,3,4,5,5-pentachloro-1-(3-hydroxybenzyl)-1,3-cyclopentadiene, 1,3,4,5,5-pentachloro-2-(3-hydroxybenzyl)-1,3-cyclopentadiene and 1,2,3,4,5-pentachloro-5-(3-hydroxybenzyl)-1,3-cyclopentadiene is separated and recovered.

Example VI

An insecticidal solution is prepared by admixing 1 g. of the reaction product obtained in Example I above, that is, a mixture of 2,3,4,5,5-pentachloro-1-(4-nitrobenzyl)-1,3-cyclopentadiene, 1,3,4,5,5-pentachloro-2-(4-nitrobenzyl)-1,3-cyclopentadiene and 1,2,3,4,5-pentachloro-5-(4-nitrobenzyl)-1,3-cyclopentadiene with 1 g. of benzene. The solution is admixed with 100 cc. of water using Triton X-100 as an emulsifying agent. The solution is sprayed into a cage containing houseflies and will result in a 100% knockdown. Similar tests with solutions using the compounds set forth in Examples II to V will show similar results.

I claim as my invention:

1. A compound selected from the group consisting of chloro substituted conjugated alkadienic and chloro substituted conjugated cycloalkadienic derivatives of an alkyl aromatic compound having a nuclear substituent selected from the group consisting of nitro, amino, alkoxy and hydroxy radicals, the cycloalkadiene derivative having a methylene bridge between the cycloalkadiene ring and the aromatic ring.
2. 1-(4-nitrobenzyl)-1,2,3,4,4-pentachloro-1,3-butadiene.
3. Pentachloro-(4-nitrobenzyl)-1,3-cyclopentadiene.
4. Pentachloro-(4-aminobenzyl)-1,3-cyclopentadiene.
5. 1-(4-aminobenzyl)-1,2,3,4,4-pentachloro-1,3-butadiene.
6. Pentachloro-(3-hydroxybenzyl)-1,3-cyclopentadiene.
7. A chloro substituted conjugated alkadienic derivative of a nuclearly monosubstituted alkyl aromatic compound in which the nuclear substituent is selected from the group consisting of nitro, amino, alkoxy and hydroxy radicals.
8. A chloro substituted conjugated cycloalkadienic derivative of a nuclearly monosubstituted alkyl aromatic compound in which the nuclear substituent is selected from the group consisting of nitro, amino, alkoxy and hydroxy radicals, said derivative having a methylene bridge between the cycloalkadiene ring and the aromatic ring.

References Cited in the file of this patent

UNITED STATES PATENTS

| | | |
|---|---|---|
| 2,894,994 | Schmerling | July 14, 1959 |
| 2,894,995 | Schmerling | July 14, 1959 |